US012445630B2

(12) United States Patent
Zhao et al.

(10) Patent No.: US 12,445,630 B2
(45) Date of Patent: Oct. 14, 2025

(54) SYSTEMS AND METHODS FOR IMPLICIT DERIVATION IN A RECURSIVE INTRA REGION

(71) Applicant: Tencent America LLC, Palo Alto, CA (US)

(72) Inventors: Liang Zhao, Palo Alto, CA (US); Xin Zhao, Palo Alto, CA (US); Han Gao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 7 days.

(21) Appl. No.: 18/633,369

(22) Filed: Apr. 11, 2024

(65) Prior Publication Data
US 2025/0175620 A1    May 29, 2025

Related U.S. Application Data

(60) Provisional application No. 63/604,081, filed on Nov. 29, 2023.

(51) Int. Cl.
*H04N 19/159*  (2014.01)
*H04N 19/176*  (2014.01)

(52) U.S. Cl.
CPC ......... *H04N 19/159* (2014.11); *H04N 19/176* (2014.11)

(58) Field of Classification Search
CPC ..................... H04N 19/159; H04N 19/176
See application file for complete search history.

(56) References Cited

U.S. PATENT DOCUMENTS

| | | | |
|---|---|---|---|
| 2014/0226720 | A1 | 8/2014 | Park |
| 2016/0057430 | A1 | 2/2016 | Kolesnikov et al. |
| 2018/0192076 | A1 | 7/2018 | Ikai et al. |
| 2018/0288446 | A1 | 10/2018 | An et al. |
| 2019/0306518 | A1 | 10/2019 | Oh et al. |
| 2020/0021811 | A1 | 1/2020 | Nguyen et al. |

(Continued)

OTHER PUBLICATIONS

Peter de Rivaz et al., "AV1 Bitstream & Decoding Process Specification", Version 1.0.0 with Errata 1, the Alliance for Open Media, Jan. 2019, 681 pgs.

(Continued)

*Primary Examiner* — Nam D Pham
(74) *Attorney, Agent, or Firm* — Morgan, Lewis & Bockius LLP

(57) ABSTRACT

An example method of video coding includes receiving a video bitstream including a plurality of coding blocks; identifying, based on a first indicator in the video bitstream, a coding region that comprises two or more blocks of the plurality of coding blocks, where at least one block in the coding region is encoded in an intra prediction mode and at least one block in the coding region is encoded in a non-intra prediction mode. For a last block in the coding region, when all preceding blocks in the coding region are encoded in the intra prediction mode, the method includes inferring a prediction mode of the last block as being an inter prediction mode without receiving an inter prediction mode indicator for the last block; and reconstructing the last block using the inferred prediction mode.

20 Claims, 7 Drawing Sheets

(56) References Cited

U.S. PATENT DOCUMENTS

| | | | |
|---|---|---|---|
| 2021/0037242 A1 | 2/2021 | Zhao et al. | |
| 2021/0084306 A1 | 3/2021 | Sasai et al. | |
| 2021/0235079 A1 | 7/2021 | Chuang et al. | |
| 2022/0038692 A1 | 2/2022 | Ko et al. | |
| 2022/0046255 A1 | 2/2022 | Zhu et al. | |
| 2022/0070483 A1 | 3/2022 | Liu et al. | |
| 2022/0094958 A1 | 3/2022 | Kim et al. | |
| 2022/0094987 A1* | 3/2022 | Zhang | H04N 19/625 |
| 2022/0248009 A1 | 8/2022 | Xu et al. | |

OTHER PUBLICATIONS

Urvang Joshi et al., "Uneven 4-Way Partitions", Alliance for Open Media, Codec Working Group, Document: CWG-D035_v2, Google LLC, Jun. 2023, 9 pgs.

Yue Chen et al., "Extended Recursive Partitions (Amendment 1)", Alliance for Open Media, Codec Working Group, Document: CWG-C090, Google LLC, Dec. 2022, 13 pgs.

Tencent America LLC, ISRWO, PCT/US2024/025262, Aug. 2, 2024, 7 pgs.

Tencent America LLC, ISRWO, PCT/US2024/025263, Aug. 12, 2024, 10 pgs.

Tencent America LLC, ISRWO, PCT/US2024/025266, Aug. 12, 2024, 9 pgs.

Tencent America LLC, ISRWO, PCT/US2024/025268, Aug. 7, 2024, 9 pgs.

Tencent America LLC, ISRWO, PCT/US2024/025269, Aug. 7, 2024, 10 pgs.

Yu-Wen Huang et al., "Block Partitioning Structure in the VVC Standard", IEEE Transactions on Circuits and Systems for Video Technology, vol. 31, Iss. 10, Jun. 2021, 16 pgs.

* cited by examiner

SYSTEMS AND METHODS FOR IMPLICIT DERIVATION IN A RECURSIVE INTRA REGION

RELATED APPLICATIONS

This application claims priority to U.S. Provisional Patent Application No. 63/604,081, entitled "Implicit Derivation for Recursive Intra Region" filed Nov. 29, 2023, which is hereby incorporated by reference in its entirety.

TECHNICAL FIELD

The disclosed embodiments relate generally to video coding, including but not limited to systems and methods for implicitly deriving a prediction mode of a last coding block in a coding region.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to block partitioning, intra prediction, and implicitly deriving a prediction mode of a last coding block in a coding region. For example, the prediction mode of the last coding block in the coding region may be derived based on a signaled flag indicating that at least one coding block in the coding region is encoded in an intra (or inter) prediction mode and no prior block of the coding region being coded in the intra (or inter) prediction mode. An advantage of inferring a prediction mode of a last coding block is minimizing the overhead used in signaling.

In accordance with some embodiments, a method of video decoding includes receiving a video bitstream comprising a plurality of coding blocks; (ii) identifying, based on a first indicator in the video bitstream, a coding region that comprises two or more blocks of the plurality of coding blocks, where at least one block in the coding region is encoded in an intra prediction mode and at least one block in the coding region is encoded in a non-intra prediction mode; (iii) for a last block in the coding region: when all preceding blocks in the coding region are encoded in the intra prediction mode, (iv) inferring a prediction mode of the last block as being an inter prediction mode without receiving an inter prediction mode indicator for the last block; and when all preceding blocks in the coding region are encoded in non-intra prediction modes, (v) inferring the prediction mode of the last block in the coding region as being the intra prediction mode without receiving an intra prediction mode indicator for the last block; and (vi) reconstructing the last block using the inferred prediction mode.

In accordance with some embodiments, a method of video encoding includes (i) receiving video data comprising a plurality of blocks; (ii) identifying a coding region that comprises two or more blocks of the plurality of coding blocks, where at least one block in the coding region is to be encoded in an intra prediction mode and at least one block in the coding region is to be encoded in a non-intra prediction mode; (iii) when all preceding blocks in the coding region are to be encoded in a same prediction mode, forgoing signaling, via a video bitstream, a prediction mode indicator for a last block of the coding region; and (iv) encoding the last block using a prediction mode that is different than the same prediction mode.

In accordance with some embodiments, a method of processing visual media data includes: (i) obtaining a source video sequence that comprises a plurality of frames; and (ii) performing a conversion between the source video sequence and a video bitstream of visual media data, where the video bitstream includes: (a) a plurality of encoded blocks corresponding to the plurality of frames; and (b) an indicator indicating a coding region of a frame of the plurality of frames, wherein the coding region comprises a first block encoded in an intra prediction mode and a second block encoded in an inter prediction mode, where the video bitstream does not include a prediction mode indicator for a last block of the coding region.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

Figure 1:
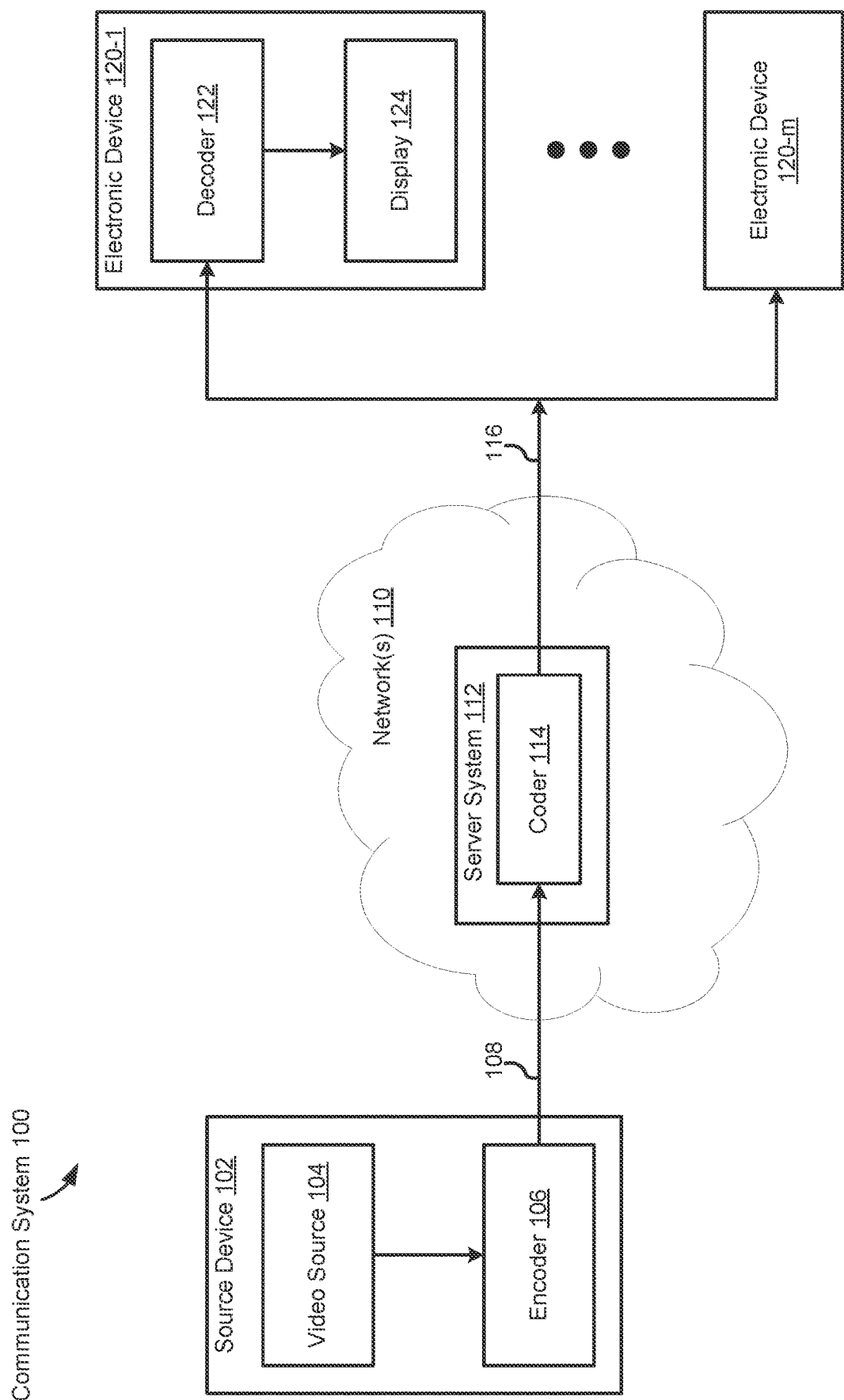
FIG. 1 is a block diagram illustrating an example communication system in accordance with some embodiments.

The present disclosure describes video/image compression techniques including block partitioning and mode signalling. As described in detail below, some embodiments include implicitly deriving a prediction mode of a last coding block in a coding region based on a signaled flag indicating that at least one coding block in the coding region is encoded in a first prediction mode and no preceding blocks of the intra region having the first prediction mode. An advantage of inferring a prediction mode of a last coding block is minimizing the overhead used in signaling (e.g., no bits used to signal the mode of the last coding block and no processing needed to encode (e.g., entropy encode) the bits).
Example Systems and Devices FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
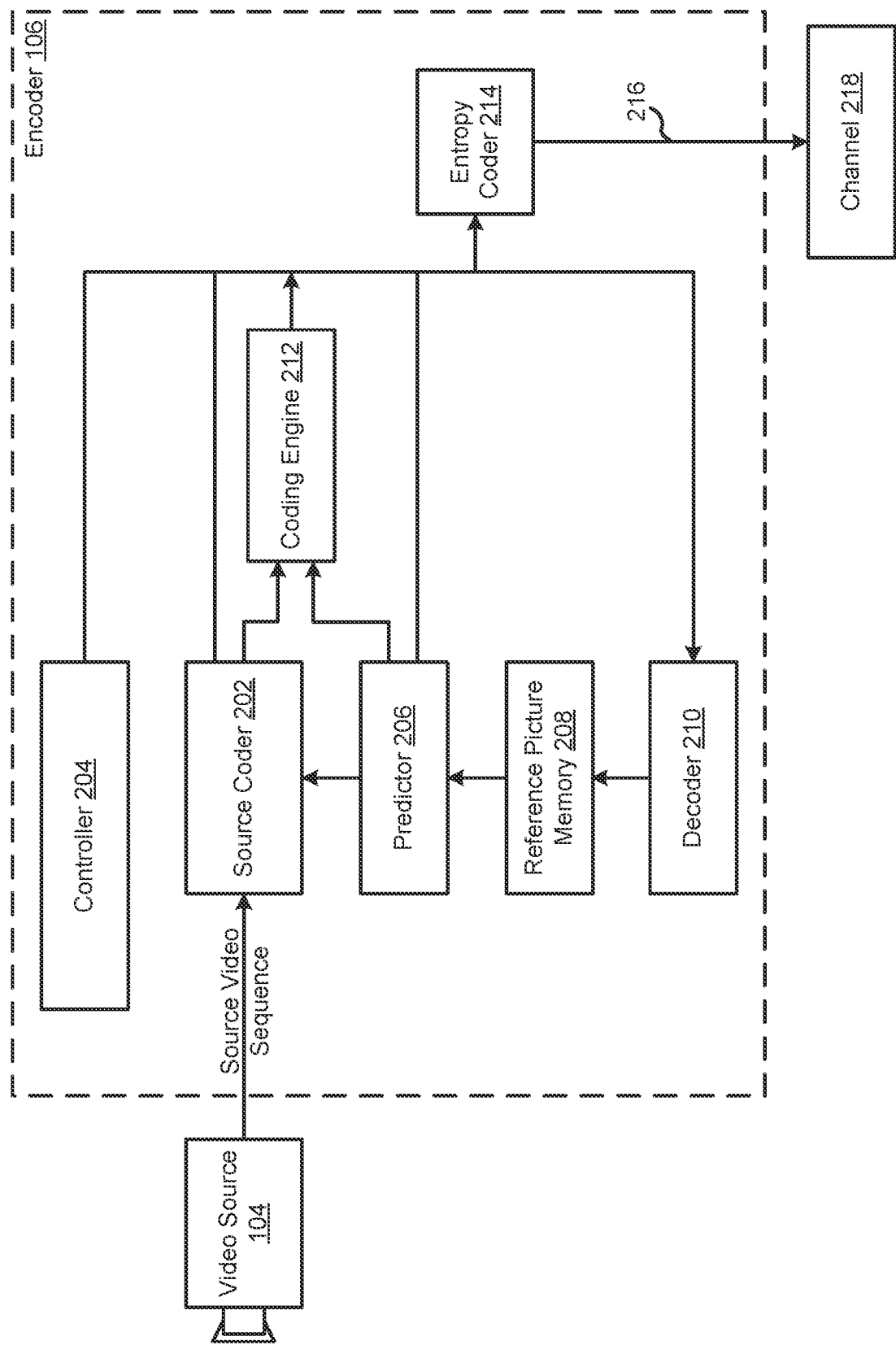
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
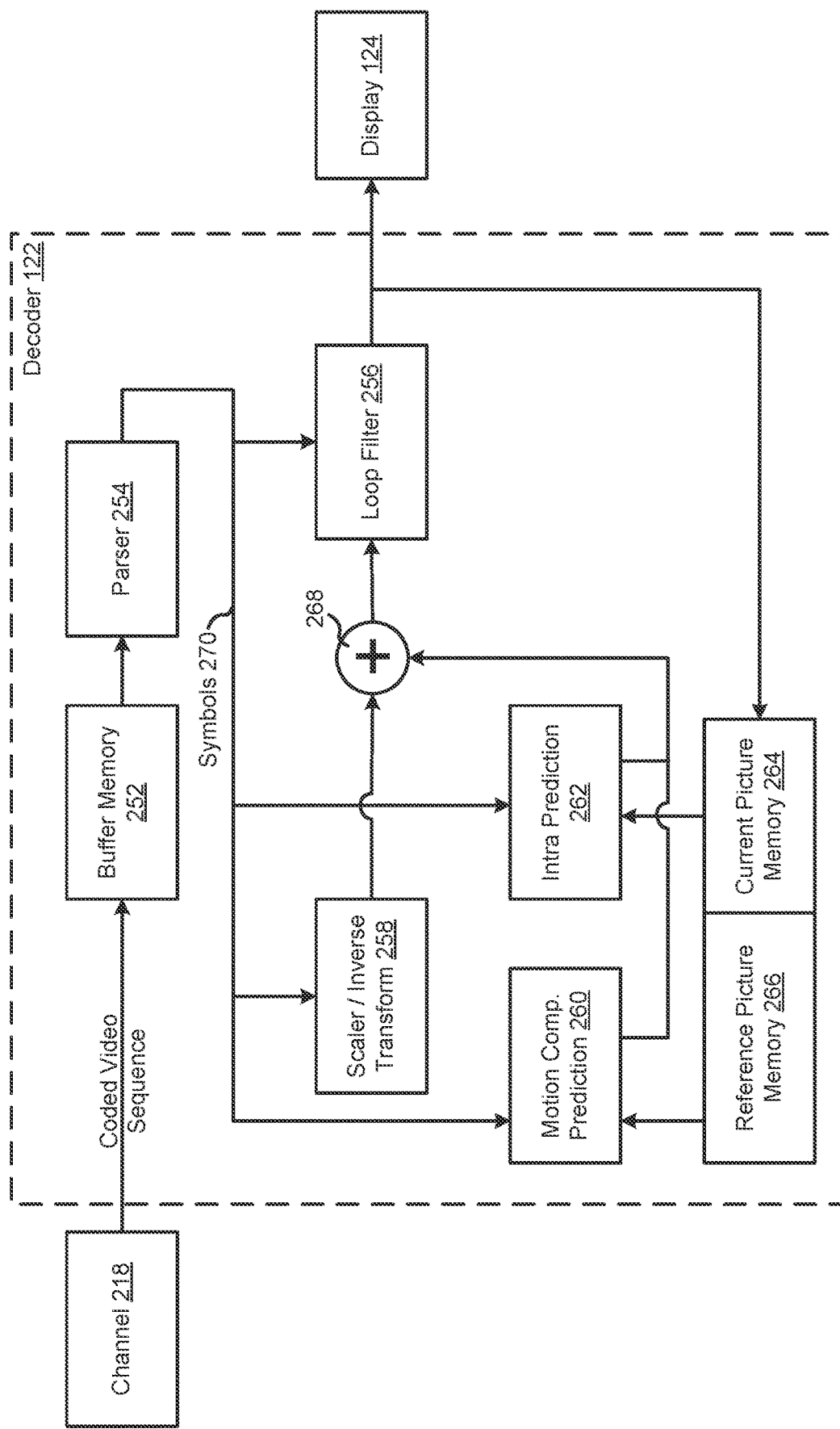
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology or standard document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
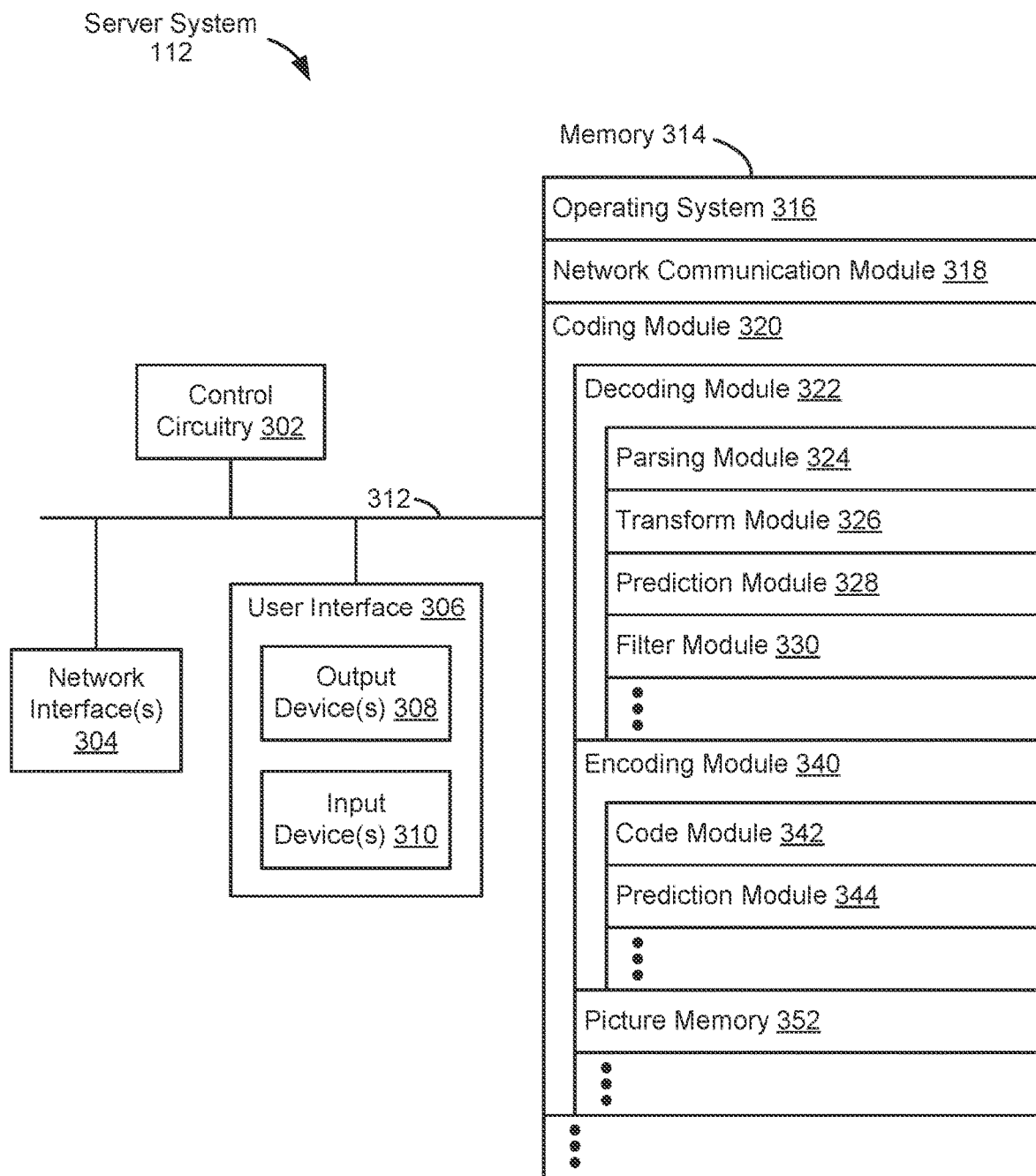
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
    - a decoding module 322 for performing various functions with respect to decoding encoded data, such as those described previously with respect to the decoder component 122; and
    - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, a block (or subblock) refers to the coding block with the coding block (such as super block, or largest coding unit, or coding tree block), a prediction block, a transform block, or a filtering unit. For example, a subblock of a block A refers to a block whose area is fully contained in the block A.

In the following, a block region refers to a specific block area which contains one or more blocks. A block size group refers to the group to which the current block belongs. Blocks of multiple sizes may belong to a single group. A block size group is a collection of multiple block sizes, e.g., multiple block sizes that are similar to each other (e.g., in terms of number of samples, or difference between width and/or height) may be assigned as a block size group. A leaf partitioning tree node refers to a partitioning block or region that is not further partitioned, and on which prediction and residual coding are performed. A non-leaf partitioning tree node, on the other hand, is further partitioned into at least two smaller blocks, or child regions on which prediction and residual coding are performed.

Block partitioning for coding and decoding, general partitioning may start from a base block (e.g., a superblock or root node) and may follow a predefined ruleset, partition structure, and/or scheme. The partitioning may be hierarchical and/or recursive. After dividing or partitioning a base block using any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB), such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The hierarchical structure of for all color channels may be collectively referred to as coding tree unit (CTU). The partitioning patterns or structures for the various color channels in a CTU may or may not be the same.

In some embodiments, either intra coding or inter-coding is allowed in different portions of a particular coding region of a frame. Specifically, either intra coding or inter-coding may be allowed in different portions of a frame specified as an inter-prediction frame. In some embodiments, if intra-inter prediction mode is permitted, either intra coding, or inter coding, or intra-inter coding is allowed in different portions of a particular coding region of a frame (e.g., an inter coded frame). In particular, a portion or an entirety of a region of a frame or picture or slice at various partitioning levels (e.g., various recursive partitioning levels) may be coded in either inter prediction mode or intra prediction mode, or when intra-inter prediction is permitted, in either inter prediction mode, or intra prediction mode, or intra-inter prediction mode. An intra-inter coding/prediction mode refers to a coding mode that generates a prediction block using both intra and inter prediction methods. For example, a prediction mode that derives the prediction block as a weighted sum of an intra prediction block and an inter prediction block.

A region, or coding region, may be used to refer to any level in any one of the partitioning schemes described above or in other partitioning schemes not specifically described above. A region therefore may be a frame, a slice, a super block, a macroblock, a subblock, a prediction block, and the like. For example, a region may be any partitioning level of a recursive partitioning scheme. A region may be at a leaf level or non-leaf level of a particular partitioning scheme. A leaf level region is a region not further partitioned. A non-leaf level region, on the other hand, is further partitioned into at least two child regions, each of which may be at a leaf level or may be at a non-leaf level and thus may be further partitioned. A leaf level region is predicted in whole using a particular prediction mode. For example, a leaf-level region may be either inter coded or intra coded. Optionally, a leaf level region may additionally be intra-inter coded if intra-inter prediction mode is permitted.

In some embodiments, when splitting a region into one or multiple sub-regions, at least one flag or syntax element is included in the bitstream by an encoder (and subsequently received, parsed, and decoded by a decoder) to indicate whether all the child regions in the region are all coded with a pre-defined prediction mode. Such a flag may be referred to as a region type flag or a regional prediction mode flag syntax element at various regional signaling levels. The partitioning scheme, for example, may be a recursive partitioning scheme, and at least one such flag may be included in the bitstream by an encoder to indicate whether all child regions within this region are coded with the pre-defined prediction mode. When all coding blocks of a region at a particular partitioning level are either all coded in the predefined prediction mode (e.g., all intra coded, all inter coded, or all intra-inter coded), then an overall regional prediction mode flag as described above may be included at the region level in the bitstream for such indication, thereby removing the necessity of including such indicators or flags at lower partitioning levels, and further removing the necessity of the normal signaling of a prediction mode at the leaf level. Signaling overhead may thus be reduced.

As such, when the decoder determines via parsing the regional prediction mode flag syntax element that all child regions in the region are coded in the predefined prediction mode, it would not expect to see any additional such flags at lower partitioning level of the region and thus can skip parsing for such lower-level flags.

When the decoder parses the bitstream and determines that the parsed syntax associated with such a flag for the region indicates that coded lower-level/child regions within the region can use different prediction modes, then decoder may expect additional lower-level regional prediction mode flag(s)/indicators (optionally at each of the corresponding partitioning level within the coding region) in the bitstream corresponding to lower-level/child regions of this region for indicating whether each of the child regions are coded under a predefined prediction mode (e.g., under an intra prediction mode, an inter prediction mode, or an intra-inter prediction mode).

In some embodiments, a region type flag may not be included in the bitstream and thus is not received at the decoder side when the block partitioning mode syntax indicates current region is not further split (e.g., the current region is a leaf level partition). Another leaf level flag may be included instead to indicate whether this leaf partition is intra coded, inter coded, or intra-inter coded, if there has been no higher-level flag indicating that this partition is all intra-coded or all inter-coded.

In some embodiments, one high-level syntax may be included in the bitstream by the encoder and received at the decoder side to indicate whether the indication for the predetermined prediction mode can be applied to current sequence/frame/slice/super block or not. In other words, whether the scheme above is used at and below a particular partition level may be enabled or disabled. If it is disabled, then no region level flag as described above may be included in the bitstream, and prediction mode may instead be indicated at leaf level for each of the leaf blocks.

Figure 4A:
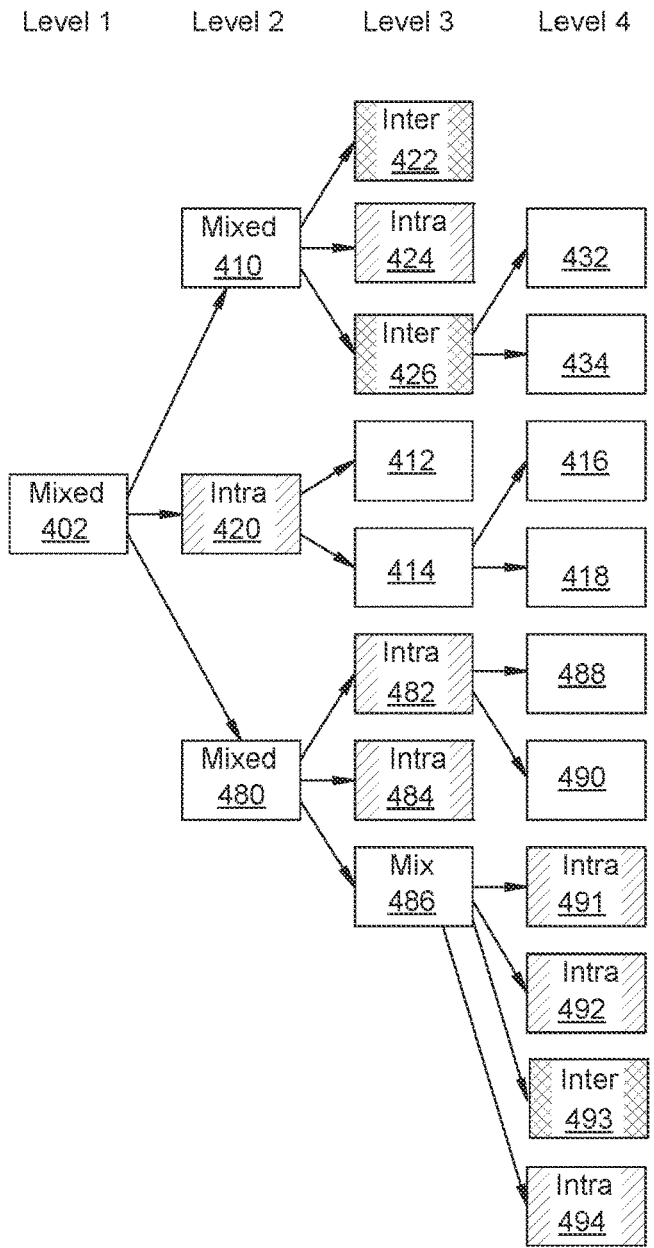
FIGS. 4A, 4B, 4C, and 4D illustrate an example of partitioning of coding blocks into regions in accordance with some embodiments.

FIG. 4A illustrates an example of inferring a prediction mode for a coding region within a mixed coding region in accordance with some embodiments. A region type flag, such as intra_region_flag, inter_region_flag, mixed_region_flag, intra-inter_region_flag, or other region type flags, indicates a type of prediction mode used to encode all coding blocks within a coding region. For example, intra_region_flag indicates that a corresponding region in, e.g., a frame of inter-prediction type (signaled by higher level syntax, such as a frame-level syntax) includes coding blocks that are all intra-coded (e.g., coded using an intra prediction mode). Similarly, inter_region_flag indicates that a corresponding region includes coding blocks that are all inter-coded (e.g., coded using an intra prediction mode). In contrast, mixed_region_flag indicates that a corresponding region includes some coding blocks that are intra-coded, and some coding blocks that are all inter-coded, while intra-inter_region_flag indicates that a corresponding region includes coding blocks that are all coded as weighted sums of one or more inter-prediction blocks and one or more intra-prediction blocks. FIG. 4A shows, as an example partitioning scheme, a top region 402 (e.g., a superblock) that is partitioned into regions or blocks at four levels or depths labeled as level 1 through level 4. Leaf level regions (sometimes also called leaf partitioning tree nodes) include regions 412, 416, 418, 432, 434, 488, 490, 491, 492, 493 and 494. Regions in FIG. 4A that include a label of "mixed," "intra," or "inter" represent regions having a corresponding region type flag. Conversely, the absence of labels in blocks illustrated in FIG. 4A indicates that region type flags are optionally not present, or that the decoder does not need to detect the presence (e.g., skip the parsing) of region type flags for the corresponding child regions or blocks.

In FIG. 4A, the top region 402 includes a mixed_region_flag. The presence of mixed_region_flag for top region 402 indicates that one or more first coding blocks (e.g., a first region) in top region 402 are intra-coded, and one or more second coding blocks (e.g., a second region) in top region 402 are inter-coded. In this example, top region 402 is partitioned into two regions, region 410, and region 420, which are both partitions at level 2, and at a depth of one from the top region 402. For example, top region 402 is partitioned in accordance with a predetermined partitioning scheme.

The intra_region_flag is present for region 420, indicating that all the coding blocks within region 420 are intra-coded. The region 420 further partitions into region 412 and region 414. The region 414, a level 3 partition at a depth of two from top region 402, is further partitioned into region 416 and region 418, which are partitions at level 4, and at a depth of three from top region 402. No intra_region_flags may be present for 412, 414, 416 and 418 because they are all partitions of region 420 and have been flagged at region 420 as being intra-coded. As such, the decoding component optionally will not perform any additional determination of intra_region_flags when parsing any partitions below region 420, including regions 412, 414, 416, and 418. Optionally, regions 412, 416, and 418 that are also leaf partitions may not include any other prediction mode indicators as they are intra-coded as indicated by the presence of intra_region_flags at region 420.

The mixed_region_flag is present for region 410, indicating that one or more first coding blocks (e.g., a first region) in region 410 are intra-coded, and one or more second coding blocks (e.g., a second region) in region 410 are inter-coded. The region 410 further partitions into region 422, region 424, and region 426, which are level 3 partitions. The inter_region_flag is present for region 422, indicating that all the coding blocks within region 422 are inter-coded, and the intra_region_flag is present for region 424, indicating that all the coding blocks within region 424 are intra-coded.

The inter_region_flag is present for region 426, indicating that all the coding blocks within region 422 are inter-coded. Further, region 426 is partitioned into two level 4 partitions of region 432 and region 434. No inter_region_flags may be present for 432 and 434 because they have both been flagged at region 426 as being inter-coded. In some embodiments, a flag is used to indicate that a region or block is coded in an intra-inter coding mode. An intra-inter coding mode refers to a coding mode that generates prediction block with both intra and inter predictions. For example, a prediction mode that derives the prediction block as a (e.g., weighted sum) of an intra prediction block and an inter prediction block.

The regions 422, 424, 432, 434, 412, 416, 418, 488, 490, 491, 492, 493 and 494 are leaf partitions. Optionally, the decoder does not determine whether any region type flags are present for leaf partitions and/or reads a leaf-level prediction mode indicator for the leaf partitions to determine their respective prediction mode. For example, a leaf partition under a region having a mixed_region_flag optionally does not include a region type flag but instead includes a prediction mode indicator for the decoder to determine the prediction mode of the leaf partition. In contrast, because regions 432, 434 are leaf partitions under an inter-coded region, region type flags and prediction mode indicators are optionally not signaled for these regions (e.g., all coding blocks in 432, 434 are inferred as inter-coded blocks). Similarly, because regions 416 and 418 are leaf partitions under an intra-coded region, region type flags and prediction mode indicators are optionally not signaled for these regions (e.g., all coding blocks in regions 432 and 434 are inferred as intra-coded blocks).

The mixed_region_flag is present for region 480, which is partitioned into three regions: an intra region 482, an intra-coded region 484 that is also a leaf partition, and another mixed coded region 486. All three partitions are at level 3, and at a depth of two from the top region 402. The region 482 is further partitioned into region 488 and region 490. The region 486 is further partitioned into region 491, region 492, region 493 and region 494.

Figure 4B:
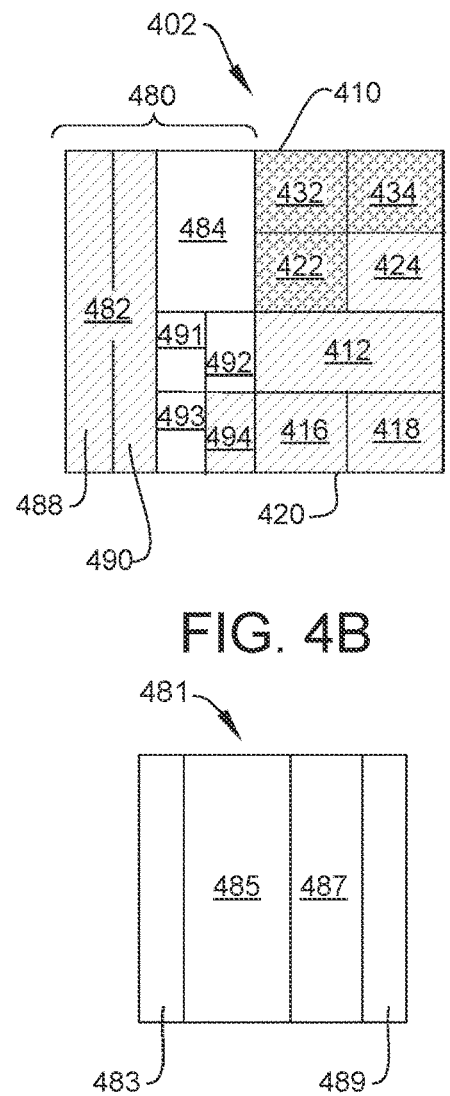

FIG. 4B illustrates an example partitioning pattern corresponding to the partition scheme described above with respect to FIG. 4A. For example, top region 402 is split into three partitions: region 410, region 420, and region 480, similar to partition 505 shown in FIG. 5. The second level region 420 is further horizontally split into two equally sized third level regions 412 and 414. The region 414 is further vertically split into two equally sized fourth level regions 416 and 418. The second level region 410 is further split into three third level regions 422, 424, and 426 (e.g., illustrated by partition 506 in FIG. 5). The region 426 is further horizontally split into two equally sized regions 432 and 434, that are level 4 partitions. The second level region 480 is split into three partitions: region 482, region 484, and region 486, similar to partition 505 shown in FIG. 5. The third level region 482 is further vertically split into two equally sized fourth level regions 488 and 490. The region 486 is further vertically split into four equally sized fourth level regions 491, 492, 493 and 494, similar to partition 510 in FIG. 5. In this example, the diagonal line shaded regions 420, 412, 414, 416, 418, 424, 482, 488, 490, 491, 492 and 494 are all intra-coded, whereas cross-hatched regions 422, 426, 432, and 434 are all inter-coded. In this example, the mixed_region_flag for the region 402 may be signaled, optionally with a predefined value to indicate that the region 402 includes both coding blocks that are intra-coded and coding blocks that are inter-coded. Similarly, intra_region_flag may be signaled for each of the regions 420, 412, 414, 416, 418, 424, 482, 488, 490 and 494 that are all intra-coded. For the region 420, intra_region_flag is signaled to indicate that all subsequent partitions are all intra coded. Consequently, no further lower level intra_region_flags are included for regions 412, 414, 416, 418, no matter whether they are leaf level partitions or not. This may help to reduce signaling overhead. Similarly, inter_region_flag may be used to indicate that regions 422, 426, 432 and 434 are all inter-coded. For top region 402, and region 410, mixed_region_flag may be used to indicate that some coding bocks are inter-coded while others are intra-coded.

Figure 5:
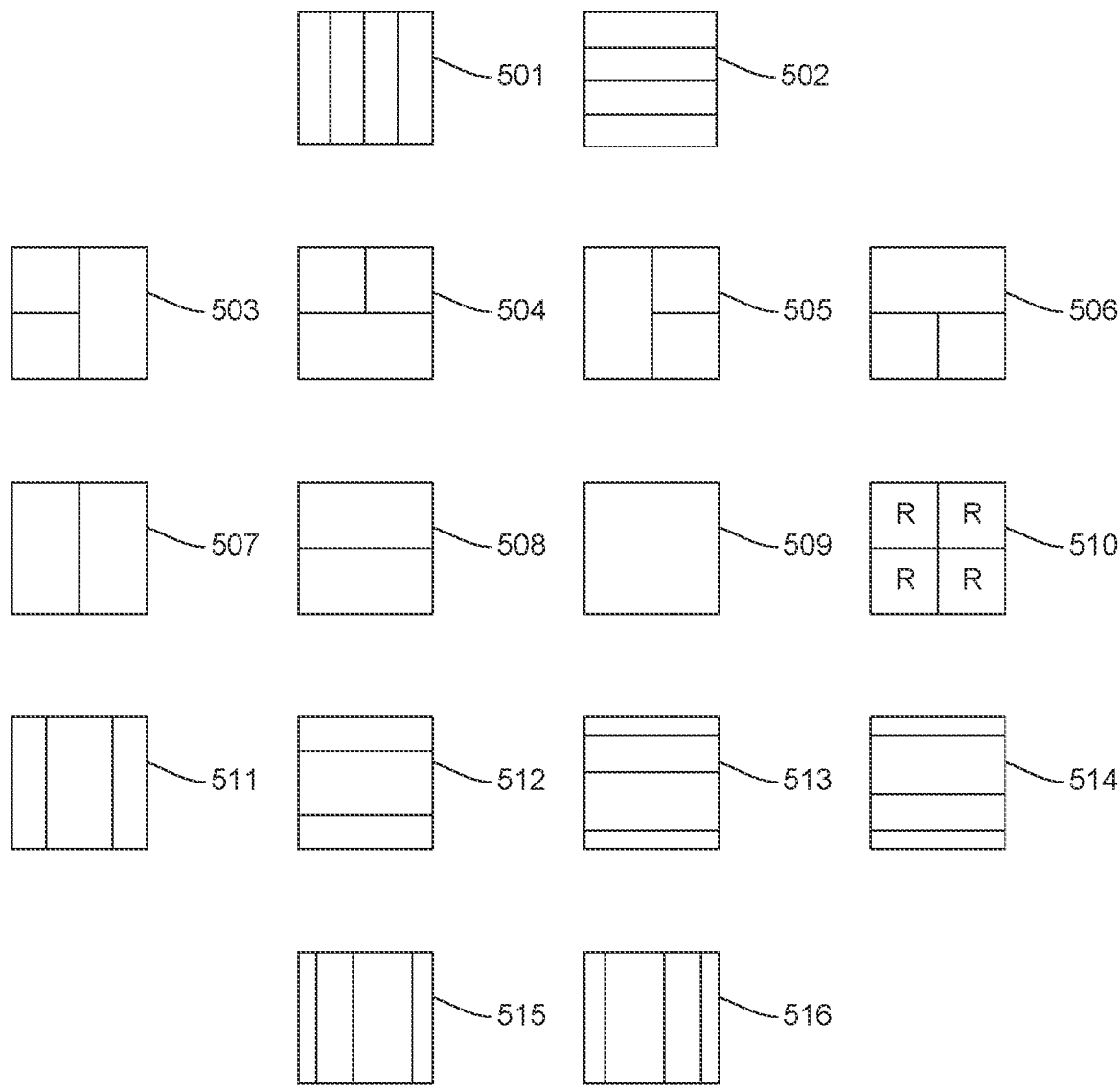
FIG. 5 illustrates different types of coding block partitioning in accordance with some embodiments.

FIG. 5 shows various partition types and partitioning structures in accordance with some embodiments. The partition types and/or structures illustrated in FIG. 5 may be used with the regions and flags described previously with respect to FIGS. 4A and 4B. An example predefined 10-way partitioning structure allows recursive partitioning to form a partitioning tree. The root block may start at a predefined level (e.g., from a base block at 128×128 or 64×64 level). Partitions 501, 502, 503, 504, 505, 506, 507, 508, 509, and 510 shown in FIG. 5 include various 2:1/1:2 and 4:1/1:4 rectangular partitions. The partition type may also include partitions from a ternary partitioning scheme that may be implemented vertically, as shown in partition 511, or horizontally, as shown in partition 512. While the example split ratio in FIG. 5 is shown as 1:2:1 for partitions 511 and 512, other ratios may be used. FIG. 5 also shows partition types that include partitions from an uneven 4-way split/partitioning scheme that may be implemented horizontally, as shown in partitions 513 and 514, or vertically, as shown in partitions 515 and 516. Partition 513 is horizontally split into 1:2:4:1 regions. Partition 514 is horizontally split into 1:4:2:1 regions. Partition 515 is vertically split with 1:2:4:1 regions. Partition 516 is vertically split with 1:4:2:1 regions.

In some embodiments, for mixed coded region that is a non-leaf partitioning tree node, at least one of the coding blocks within (e.g., under, or below) the mixed coded region is coded with the intra prediction mode and at least one of the coding blocks within (e.g., under, or below) the mixed region is coded with the inter prediction mode. In some embodiments, prior to encoding or decoding the last leaf node coded block under a mixed coded region, if all the processed blocks (preceding blocks in the coding order) are coded using the intra prediction mode (or inter prediction mode), then a last remaining coding block is inferred as a coding block that is coded using the inter prediction mode (or intra prediction mode). A prediction mode flag for indicating whether that last coding block (e.g., a current coding block) is coded using the intra prediction mode or the inter prediction mode is not signaled into the bitstream. For example, if the three level 3 regions partitioned from the region 410 is processed (e.g., decoded or encoded) in the order of region 426, region 422, and region 424, because the regions preceding the region 424 are coded using the inter prediction mode, the last region 424, a leaf partition, is inferred to be coded using the intra prediction mode, and no prediction mode flag (indicating the intra prediction mode) is signaled into the bitstream for the region 424.

Figure 4C:
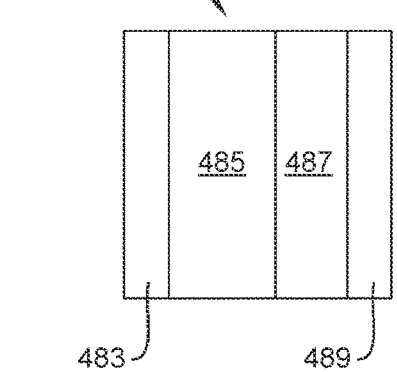
Figure 4D:
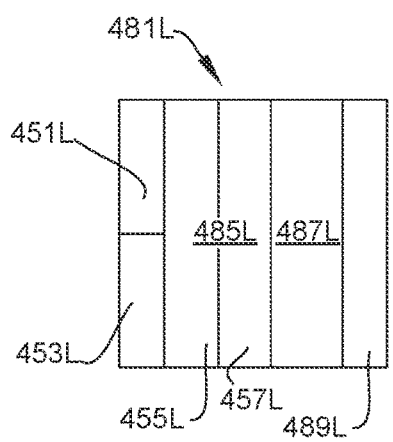

In some embodiments, after partitioning a coding region, if the block width or the block height of one child partition is smaller than or equal to one threshold, such as 4 in term of luma samples, then all the child partitions under the coding region (a non-leaf node) is inferred as either an inter region or an intra region. No child partitions is allowed to be a mixed coded region. For example, a non-leaf node 481 shown in FIG. 4C is partitioned into four regions 483, 485, 487, and 489 having block sizes of: 4×32, 16×32, 8×32, and 4×32, respectively. For a threshold of size 4, two child regions (e.g., region 483 and region 489) are equal to the threshold, so none of the four child regions can be a mixed coded region. A coding block in the child partition may be a luma coding block (also referred to as a "luma block") or a chroma coding block (also referred to as a "chroma block"). In some embodiments, luma blocks under the non-leaf node are allowed to further partition but chroma blocks under this non-leaf node are not allowed to further split. For example, the partitioning of the non-leaf node 481 illustrates the partition of the chroma blocks, and the luma partition 481L in FIG. 4D shows that the luma blocks for region 483 can be further partitioned into luma partition regions 451L, and 453L, while luma blocks for region 485 can be further partitioned into luma partition regions 455L, and 457L.

In some embodiments, one high-level syntax may be included in the bitstream by the encoder and received at the decoder side to indicate whether the indication for the predetermined prediction mode can be applied to current sequence/frame/slice/super block or not. In other words, whether the scheme above is used at and below a particular partition level may be enabled or disabled. If it is disabled, then no region level flag as described above may be included in the bitstream, and prediction mode may instead be indicated at leaf level for each of the leaf blocks.

Alternatively, all the child partitions under the coding region (a non-leaf node) is inferred as intra region if any one of the child partitions has a block width or a block height that is smaller than or equal to one threshold, such as 4 in term of luma samples. For example, returning to the example described above, the four regions 483, 485, 487, and 489 are inferred to be intra regions due to the size of the region 483 and the region 489. The region type flag (e.g., an intra_region_flag) is not signaled for the (non-leaf) coding region 481. In some embodiments, luma blocks under the (non-leaf) coding region 481 are allowed to further split and chroma blocks under this non-leaf node are not allowed to further split. For example, the partitioning of the non-leaf node 481 illustrates the partition of the chroma blocks, and the luma partition 481L in FIG. 4D shows that the luma blocks for region 483 can be further partitioned into luma partition regions 451L, and 453L, while luma blocks for region 485 can be further partitioned into luma partition regions 455L, and 457L.

In some embodiments, after partitioning a coding region (a non-leaf node), if the number of splits or depth from the root node (e.g., top region 402) is larger than (or equal to) a first threshold, then all the child partitions under the coding region are inferred as intra regions, and no region type flag (e.g., an intra_region_flag) is signaled for the parent coding region (e.g., the non-leaf node). The child partitions under the coding region are not inferred as inter regions because the high number of splits indicates that the texture is complicated, so the probability that the coding region would be an inter region is low. Inferring the child partitions as intra regions helps to save overhead involved in signaling but may result in a reduction in quality. For example, if the first threshold is set as two splits from the top region 402, then the all child regions from the mixed region 486 would be inferred as intra region, and no region type flag (e.g., mixed_region_flag) is signaled for the parent mixed coded region 486 (e.g., using this approximation, the region 493 would no longer be correctly coded as an inter region).

In some embodiments, if certain partition types are used to partition a non-leaf node, then only a subset of the region types are allowed. In some embodiments, if an uneven 4-way partitioning (partitions 513, 514, 515, and 516 in FIG. 5) is used to split a (non-leaf) coding region, then the current non-leaf coding region can only be an inter region or an intra region, the non-leaf coding region is not permitted to be a mixed coded region.

Figures 6A, 6B:
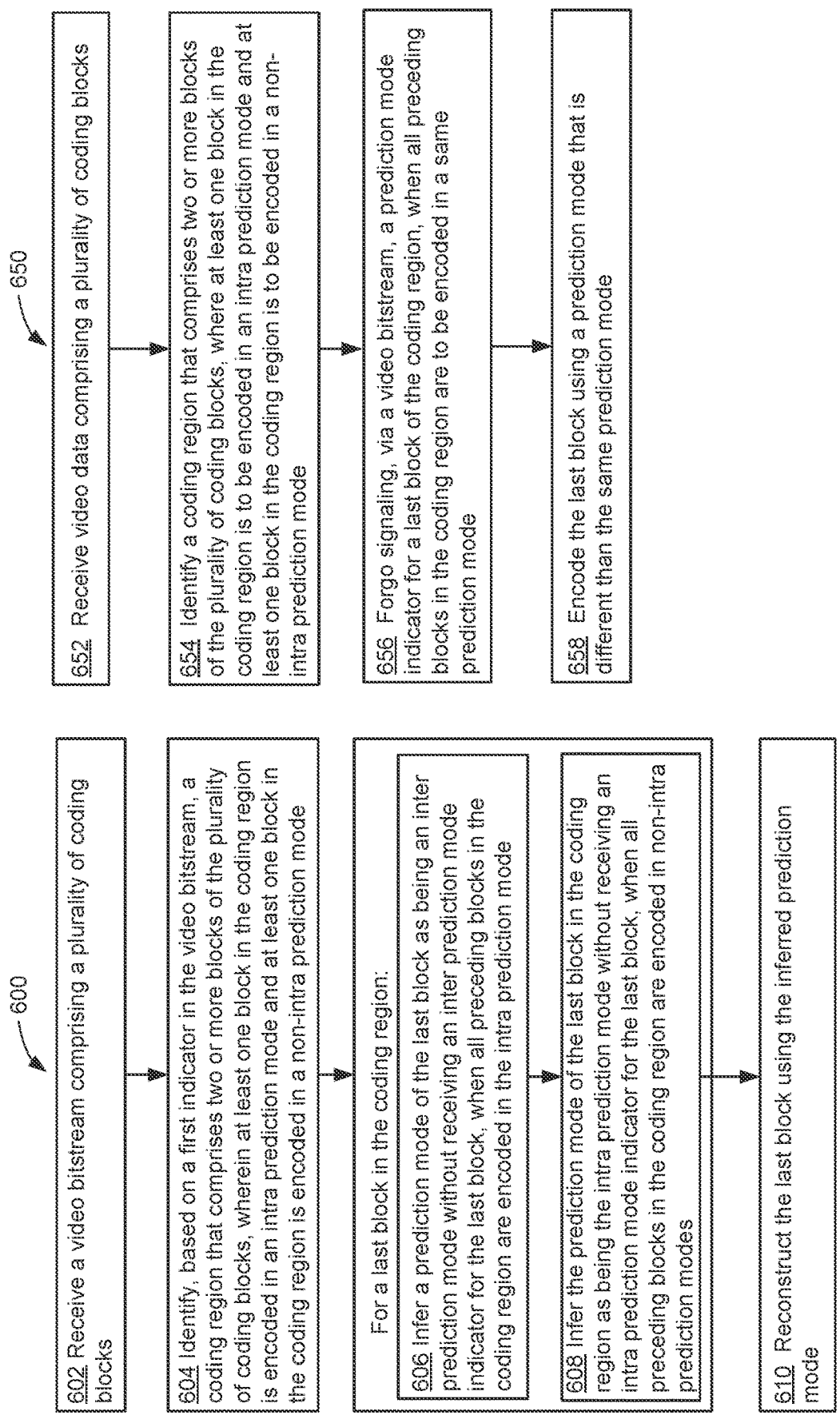
FIG. 6A illustrates an example video decoding process in accordance with some embodiments.
FIG. 6B illustrates an example video encoding process in accordance with some embodiments.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream comprising a plurality of coding blocks. The system identifies (604), based on a first indicator in the video bitstream, a coding region that comprises two or more blocks of the plurality of coding blocks, where at least one block in the coding region is encoded in an intra prediction mode and at least one block in the coding region is encoded in a non-intra prediction mode. For a last block in the coding region: when all preceding blocks in the coding region are encoded in the intra prediction mode, the system infers (606) a prediction mode of the last block as being an inter prediction mode without receiving an inter prediction mode indicator for the last block. When all preceding blocks in the coding region are encoded in non-intra prediction modes, the system infers (608) the prediction mode of the last block in the coding region as being the intra prediction mode without receiving an intra prediction mode indicator for the last block. The system reconstructs (610) the last block using the inferred prediction mode.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of coding blocks (e.g., video blocks). The system identifies (654) a coding region that comprises two or more blocks of the plurality of coding blocks, where at least one block in the coding region is to be encoded in an intra prediction mode and at least one block in the coding region is to be encoded in a non-intra prediction mode. The system forgoes (656) signaling, via a video bitstream, a prediction mode indicator for a last block of the coding region, when all preceding blocks in the coding region are to be encoded in a same prediction mode. The system encodes (658) the last block using a prediction mode that is different than the same prediction mode. As described previously, the encoding process may mirror the decoding processes described herein (e.g., regarding block partitioning and mode signaling). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream comprising a plurality of coding blocks; (ii) identifying, based on a first indicator in the video bitstream, a coding region that comprises two or more blocks of the plurality of coding blocks, where at least one block in the coding region is encoded in an intra prediction mode and at least one block in the coding region is encoded in a non-intra prediction mode; for a last block in the coding region: when all preceding blocks in the coding region are encoded in the intra prediction mode, (iii) inferring a prediction mode of the last block as being an inter prediction mode without receiving an inter prediction mode indicator for the last block; and when all preceding blocks in the coding region are encoded in non-intra prediction modes, (iv) inferring the prediction mode of the last block in the coding region as being the intra prediction mode without receiving an intra prediction mode indicator for the last block; and (v) reconstructing the last block using the inferred prediction mode. For example, when recursively splitting a first block into one or multiples of equal size or smaller size sub-blocks, at least one flag, is received at the decoder side to indicate whether all the sub-blocks within this first block are coded with a first pre-defined prediction mode or not. The said first pre-defined prediction mode can be an intra coding mode, and/or an inter coding mode, and/or a mixture of intra and inter coding mode. As an example, if one non-leaf partitioning tree node is coded as a mixture of intra and inter coded blocks, then at least one of the coded blocks under this non-leaf node (or region) should be intra coded block and at least one of the coded blocks under this region should be inter coded block. In this example, before encoding/decoding the last leaf node coded block under one mixed intra and inter region, if all the processed blocks (preceding blocks in coding order) are coded as intra blocks (or inter blocks), then the last coded block will be inferred as inter coded block (or intra coded block). And the prediction mode flag for indicating whether current coded block is intra coded or inter coded is not signaled into the bitstream. In some embodiments, the coding region comprises one or more non-leaf node blocks. In some embodiments, in accordance with a determination that all preceding blocks in the coding region are encoded in the intra prediction mode, a prediction mode of the last block is inferred as being the inter prediction mode. In some embodiments, in accordance with a determination that all preceding blocks in the coding region are encoded in non-intra prediction modes, a prediction mode of the last block is inferred as being the intra prediction mode.

(A2) In some embodiments of A1, the method further includes when the coding region includes only one partition, identifying at least one first block of the coding region as intra coded and identifying at least one second block of the coding region as mixed coded. For example, one non-leaf partitioning tree node is coded as a mixture of intra and inter coded blocks, and it is only further split once, and all its child nodes are not further split, then at least one of its child nodes should be coded as mixed intra and inter region, and at least one of its child nodes should be coded as intra region. In some embodiments, in accordance with a determination that the coding region includes only one partition, at least one first block of the coding region is identified/denoted as intra coded and at least one second block of the coding region is identified/denoted as mixed coded.

(A3) In some embodiments of A2, the method further includes when all preceding blocks in the coding region are mixed coded, inferring the prediction mode of the last block in the coding region as being the intra prediction mode without receiving the intra prediction mode indicator for the last block. For example, one non-leaf partitioning tree node is coded as a mixture of intra and inter coded blocks, and it is only further split once, and all its child nodes are not further split. Before encoding/decoding the last child node under one mixed intra and inter region, if all the processed blocks are coded as mixed intra and inter region, then the last child node will be inferred as intra region. And the region type flag is not signaled for the last child node. In some embodiments, in accordance with a determination that all preceding blocks in the coding region are mixed coded, the prediction mode of the last block in the coding region is inferred/derived as being the intra prediction mode.

(A4) In some embodiments of any of A1-A3, the method further includes: when all preceding blocks in the coding region are intra coded, inferring the prediction mode of the last block in the coding region as being mixed coded without receiving a prediction mode indicator for the last block. For example, one non-leaf partitioning tree node is coded as a mixture of intra and inter coded blocks, and it is only further split once, and all its child nodes are not further split. Before encoding/decoding the last child node under one mixed intra and inter region, if all the processed blocks are coded as intra region, then the last child node will be inferred as mixed intra and inter region. And the region type flag is not signaled for the last child node. In some embodiments, in accordance with a determination that all preceding blocks in the coding region are intra coded, the prediction mode of the last block in the coding region is inferred/derived as being mixed coded.

(A5) In some embodiments of any of A1-A4, the method further includes: when the coding region has a size that does not meet one or more criteria, restricting all blocks of the coding region from being mixed coded. For example, after splitting one non-leaf node in partitioning tree, if the width or height of one child node is smaller than or equal to one threshold, such as 4 in term of luma samples, then all the child nodes under this non-leaf node is inferred as inter region or intra region. All the child nodes under this non-leaf node are not allowed to be mixed intra and inter region. In some embodiments, in accordance with a determination that the coding region has a size that does not meet one or more criteria (e.g., a height or width that is less than a predefined threshold), all blocks of the coding region are restricted from being mixed coded (e.g., are identified/denoted as being inter coded or intra coded).

(A6) In some embodiments of any of A1-A5, restricting all of the blocks of the coding region from being mixed coded comprises inferring all of the blocks of the coding region as being intra coded. For example, after splitting one non-leaf node in partitioning tree, if the width or height of one child node is smaller than or equal to one threshold, such as 4 in term of luma samples, then all the child nodes under this non-leaf node is inferred as intra region. The region type flag is not signaled for this non-leaf node.

(A7) In some embodiments of any of A1-A6, the method further includes, when the coding region has a size that does not meet one or more criteria, restricting partitioning of a first color component of the coding region. For example, luma blocks under this non-leaf node are allowed to further split and chroma blocks under this non-leaf node are not allowed to further split. In some embodiments, when the coding region has the size that does not meet the one or more criteria, a first color component of the coding region is not further partitioned while a second color component of the coding region is further partitioned (e.g., is allowed to be further partitioned). In some embodiments, in accordance with a determination that the coding region has the size that does not meet the one or more criteria, a first color component of the coding region is prevented from partitioning.

(A8) In some embodiments of any of A1-A7, the method further includes, partitioning a frame of the video bitstream to obtain the coding region; and when the partitioning meets one or more depth criteria, inferring all of the blocks of the coding region as being intra coded. For example, after splitting one non-leaf node in partitioning tree, if the number of splits or depth from the root note is larger than (or equal to) one threshold, then all the child nodes under this non-leaf node is inferred as intra region. The region type flag is not signaled for this non-leaf node. In some embodiments, in accordance with a determination that the partitioning meets one or more depth criteria, blocks of the coding region are inferred as being intra coded.

(A9) In some embodiments of any of A1-A8, the method includes, partitioning a frame of the video bitstream to obtain the coding region; and when the partitioning comprises a first type of partitioning, restricting a prediction mode for blocks of the coding region. For example, if certain partition types are employed to split one non-leaf node, then only a subset of the region types can be allowed. In some embodiments, in accordance with a determination that the partitioning comprises the first type of partitioning, a prediction mode for blocks of the coding region is restricted (e.g., the blocks can be intra mode or inter mode, but not mixed mode).

(A10) In some embodiments of A9, the first type of partitioning comprises an uneven partitioning. For example, if uneven 4-way partitioning is used to split one non-leaf node, then current non-leaf node can only be inter or intra region. In other words, the mixed intra and inter region type is not allowed for this non-leaf node.

(A11) In some embodiments of any of A1-A10, restricting the prediction mode for the blocks of the coding region comprises prohibiting a mixed mode.

(B1) In another aspect, some embodiments include a method (e.g., the method 650) of video encoding. In some embodiments, the method is performed at a computing system (e.g., the server system 112) having memory and one or more processors. In some embodiments, the method is performed at a coding module (e.g., the coding module 320). The method includes: (i) receiving video data comprising a plurality of blocks; (ii) identifying a coding region that comprises two or more blocks of the plurality of coding blocks, wherein at least one block in the coding region is to be encoded in an intra prediction mode and at least one block in the coding region is to be encoded in a non-intra prediction mode; (iii) when all preceding blocks in the coding region are to be encoded in a same prediction mode, forgoing signaling, via a video bitstream, a prediction mode indicator for a last block of the coding region; and (iv) encoding the last block using a prediction mode that is different than the same prediction mode.

(B2) In some embodiments of B1, the same prediction mode is the intra prediction mode or an inter prediction mode.

(B3) In some embodiments of B1 or B2, the computing system further includes instructions for signaling an indication of the coding region via the video bitstream.

(B4) In some embodiments of any of B1-B3, the computing system further includes instructions for, when the coding region has a size that does not meet one or more criteria, forgoing signaling a prediction mode indicator for at least one block of the coding region. For example, the at least one block has less signaled prediction mode indicators than other blocks.

(B5) In some embodiments of any of B1-B4, the computing system further includes instructions for partitioning a frame of the video data to identify the coding region; and when the partitioning meets one or more depth criteria, forgoing signaling a prediction mode indicator for at least one block of the coding region.

(B6) In some embodiments of any of B1-B5, the computing system further includes instructions for partitioning a frame of the video data to identify the coding region; and when the partitioning comprises a first type of partitioning, forgoing signaling a prediction mode indicator for at least one block of the coding region.

(B7) In some embodiments of B6, the first type of partitioning comprises an uneven partitioning.

(C1) In another aspect, some embodiments include a method of visual media data processing. In some embodiments, the method is performed at a computing system (e.g., the server system 112) having memory and one or more processors. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data, where the video bitstream includes: (a) a plurality of encoded blocks corresponding to the plurality of frames; and (b) an indicator indicating a coding region of a frame of the plurality of frames, wherein the coding region comprises a first block encoded in an intra prediction mode and a second block encoded in an inter prediction mode, where the video bitstream does not include a prediction mode indicator for a last block of the coding region.

(C2) In some embodiments of C1, the video bitstream further includes an indication of one or more prediction modes for the coding region.

(D1) In one aspect, some embodiments include a method of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream comprising a plurality of frames, including a first frame; (ii) identifying a first coding region and a second coding region by partitioning the first frame at least once; and when the first coding region has a size that does not meet one or more criteria, restricting further partitioning of one or more color components of the first coding region. For example, if the width or height of one child node is smaller than or equal to one threshold, such as 4 in term of luma samples, then luma blocks under this non-leaf node are allowed to further split and chroma blocks under this non-leaf node are not allowed to further split. In some embodiments, in accordance with a determination that the first coding region has a size that does not meet one or more criteria, further partitioning of one or more color components of the first coding region is restricted (e.g., forgoing further partitioning of the first coding region). For example, partitioning instructions need not be signaled for the first coding region if the first coding region has a size that does not meet the one or more criteria.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A11, B1-B7, C1-C2, and D1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A11, B1-B7, C1-C2, and D1 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a plurality of coding blocks;
   identifying, based on a first indicator in the video bitstream, a coding region that comprises two or more blocks of the plurality of coding blocks, wherein at least one block in the coding region is encoded in an intra prediction mode and at least one block in the coding region is encoded in a non-intra prediction mode;
   for a last block in the coding region:
      when all preceding blocks in the coding region are encoded in the intra prediction mode, inferring a prediction mode of the last block as being an inter prediction mode without receiving an inter prediction mode indicator for the last block; and
      when all preceding blocks in the coding region are encoded in non-intra prediction modes, inferring the prediction mode of the last block in the coding region as being the intra prediction mode without receiving an intra prediction mode indicator for the last block; and
   reconstructing the last block using the inferred prediction mode.

2. The method of claim 1, further comprising, when the coding region includes only one partition, identifying at least one first block of the coding region as intra coded and identifying at least one second block of the coding region as mixed coded.

3. The method of claim 2, further comprising, when all preceding blocks in the coding region are mixed coded, inferring the prediction mode of the last block in the coding region as being the intra prediction mode without receiving the intra prediction mode indicator for the last block.

4. The method of claim 2, further comprising, when all preceding blocks in the coding region are intra coded, inferring the prediction mode of the last block in the coding region as being mixed coded without receiving a prediction mode indicator for the last block.

5. The method of claim 1, further comprising, when the coding region has a size that does not meet one or more criteria, restricting all blocks of the coding region from being mixed coded.

6. The method of claim 5, wherein restricting all of the blocks of the coding region from being mixed coded comprises inferring all of the blocks of the coding region as being intra coded.

7. The method of claim 1, further comprising, when the coding region has a size that does not meet one or more criteria, restricting partitioning of a first color component of the coding region.

8. The method of claim 1, further comprising:
   partitioning a frame of the video bitstream to obtain the coding region; and
   when the partitioning meets one or more depth criteria, inferring all of the blocks of the coding region as being intra coded.

9. The method of claim 1, further comprising:
   partitioning a frame of the video bitstream to obtain the coding region; and
   when the partitioning comprises a first type of partitioning, restricting a prediction mode for blocks of the coding region.

10. The method of claim 9, wherein the first type of partitioning comprises an uneven partitioning.

11. The method of claim 9, wherein restricting the prediction mode for the blocks of the coding region comprises prohibiting a mixed mode.

12. A computing system, comprising:
   control circuitry;
   memory; and
   one or more sets of instructions stored in the memory and configured for execution by the control circuitry, the one or more sets of instructions comprising instructions for:
      receiving video data comprising a plurality of blocks;
      identifying a coding region that comprises two or more blocks of the plurality of coding blocks, wherein at least one block in the coding region is to be encoded in an intra prediction mode and at least one block in the coding region is to be encoded in a non-intra prediction mode;
      when all preceding blocks in the coding region are to be encoded in a same prediction mode, forgoing signaling, via a video bitstream, a prediction mode indicator for a last block of the coding region; and
      encoding the last block using a prediction mode that is different than the same prediction mode.

13. The computing system of claim 12, wherein the same prediction mode is the intra prediction mode or an inter prediction mode.

14. The computing system of claim 12, further comprising signaling an indication of the coding region via the video bitstream.

15. The computing system of claim 12, further comprising, when the coding region has a size that does not meet one or more criteria, forgoing signaling a prediction mode indicator for at least one block of the coding region.

16. The computing system of claim 12, further comprising:

partitioning a frame of the video data to identify the coding region; and when the partitioning meets one or more depth criteria, forgoing signaling a prediction mode indicator for at least one block of the coding region.

17. The computing system of claim 12, further comprising:

partitioning a frame of the video data to identify the coding region; and when the partitioning comprises a first type of partitioning, forgoing signaling a prediction mode indicator for at least one block of the coding region.

18. The computing system of claim 17, wherein the first type of partitioning comprises an uneven partitioning.

19. A non-transitory computer-readable storage medium storing one or more sets of instructions configured for execution by a computing device having control circuitry and memory, the one or more sets of instructions comprising instructions for:

obtaining a source video sequence that comprises a plurality of frames; and performing a conversion between the source video sequence and a video bitstream of visual media data, wherein the video bitstream comprises:

a plurality of encoded blocks corresponding to the plurality of frames;

an indicator indicating a coding region of a frame of the plurality of frames, wherein the coding region comprises a first block encoded in an intra prediction mode and a second block encoded in an inter prediction mode; and wherein the video bitstream does not include a prediction mode indicator for a last block of the coding region.

20. The non-transitory computer-readable storage medium of claim 19, wherein the video bitstream further comprises an indication of one or more prediction modes for the coding region.

* * * * *